(12) United States Patent
Curtis et al.

(10) Patent No.: US 11,238,545 B2
(45) Date of Patent: Feb. 1, 2022

(54) METHOD AND SYSTEM FOR SELECTING SIMILAR CONSUMERS

(75) Inventors: Richard Tyler Curtis, Washington, DC (US); Kyle Yost, Washington, DC (US)

(73) Assignee: OPOWER, INC., Redwood Shores, CA (US)

( * ) Notice: Subject to any disclaimer, the term of this patent is extended or adjusted under 35 U.S.C. 154(b) by 0 days.

(21) Appl. No.: 13/464,314

(22) Filed: May 4, 2012

(65) Prior Publication Data
US 2012/0310708 A1 Dec. 6, 2012

Related U.S. Application Data

(60) Provisional application No. 61/483,219, filed on May 6, 2011.

(51) Int. Cl.
*G06Q 50/06* (2012.01)
*G06Q 30/02* (2012.01)

(52) U.S. Cl.
CPC ......... *G06Q 50/06* (2013.01); *G06Q 30/0201* (2013.01)

(58) Field of Classification Search
CPC ............... G06Q 30/02; G06Q 30/0255; G06Q 30/0201; G06Q 30/0204; G06Q 10/06375;
(Continued)

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

Rosenfeld et al., Patterns of Energy Use in Buildings, Jan. 1, 1996, MIT press, pp. 40-105 (Year: 1996).*

(Continued)

*Primary Examiner* — Robert D Rines
(74) *Attorney, Agent, or Firm* — Kraguljac Law Group, LLC

(57) ABSTRACT

Illustrative embodiments of the present invention are directed to methods and computer systems for reporting a consumer's usage of a resource. A computer system retrieves consumer characteristic data and resource usage data for the first consumer and a set of second consumers including characteristic data related to each consumer. The computer system selects at least one consumer that is similar to the first consumer from the set of second consumers based upon a plurality of common criteria between the first consumer's characteristic data and a second consumer's characteristic data. The computer processes may be performing iteratively until the total number of similar consumers is equal to or greater than the predetermined number of consumers. Once a desired number of similar consumers is found, the computer system generates a report that displays the first consumer's resource usage data and the at least one similar consumers' resource usage data.

16 Claims, 10 Drawing Sheets

(58) Field of Classification Search
CPC .... G06Q 10/00; G06Q 30/0251; G06Q 50/06;
G06Q 30/00201; G06N 99/005
USPC ........ 700/286, 291; 705/7.32, 37, 412, 7.33,
705/35, 7.29, 7.31, 7.11–7.42; 718/104
See application file for complete search history.

(56) References Cited

U.S. PATENT DOCUMENTS

| | | | |
|---|---|---|---|
| 5,513,519 A | | 5/1996 | Cauger et al. |
| 5,566,084 A | | 10/1996 | Cmar |
| 5,717,609 A | | 2/1998 | Packa et al. |
| 5,855,011 A | * | 12/1998 | Tatsuoka .......................... 706/45 |
| 5,873,251 A | | 2/1999 | Iino |
| 5,930,773 A | | 7/1999 | Crooks et al. |
| 5,948,303 A | | 9/1999 | Larson |
| 6,035,285 A | | 3/2000 | Schlect et al. |
| 6,088,688 A | | 7/2000 | Crooks et al. |
| 6,295,504 B1 | * | 9/2001 | Ye et al. ............................ 702/7 |
| 6,327,605 B2 | | 12/2001 | Arakawa et al. |
| 6,701,298 B1 | | 3/2004 | Jutsen |
| 6,732,055 B2 | | 5/2004 | Bagepalli et al. |
| 6,778,945 B2 | | 8/2004 | Chassin et al. |
| 6,785,620 B2 | | 8/2004 | Kishlock et al. |
| 6,972,660 B1 | | 12/2005 | Montgomery, Jr. et al. |
| 7,020,508 B2 | | 3/2006 | Stivoric et al. |
| 7,073,073 B1 | | 7/2006 | Nonaka et al. |
| 7,073,075 B2 | | 7/2006 | Freyman et al. |
| 7,136,710 B1 | | 11/2006 | Hoffberg et al. |
| 7,142,949 B2 | | 11/2006 | Brewster et al. |
| 7,149,727 B1 | | 12/2006 | Nicholls et al. |
| 7,200,468 B2 | | 4/2007 | Ruhnke et al. |
| 7,243,044 B2 | | 7/2007 | McCalla |
| 7,333,880 B2 | | 2/2008 | Brewster et al. |
| 7,356,548 B1 | | 4/2008 | Culp et al. |
| 7,444,251 B2 | | 10/2008 | Nikovski et al. |
| 7,460,502 B2 | | 12/2008 | Arima et al. |
| 7,460,899 B2 | | 12/2008 | Almen |
| 7,552,030 B2 | | 6/2009 | Guralnik et al. |
| 7,561,977 B2 | | 7/2009 | Horst et al. |
| 7,991,513 B2 | | 8/2011 | Pitt |
| 8,065,098 B2 | | 11/2011 | Gautam |
| 8,166,047 B1 | * | 4/2012 | Cohen et al. .................... 707/748 |
| 8,180,591 B2 | | 5/2012 | Yuen et al. |
| 8,239,178 B2 | | 8/2012 | Gray et al. |
| 8,260,468 B2 | | 9/2012 | Ippolito et al. |
| 8,275,635 B2 | | 9/2012 | Stivoric et al. |
| 8,280,536 B1 | | 10/2012 | Fadell et al. |
| 8,348,840 B2 | | 1/2013 | Heit et al. |
| 8,375,118 B2 | | 2/2013 | Hao et al. |
| 8,417,061 B2 | | 4/2013 | Kennedy et al. |
| 8,478,447 B2 | | 7/2013 | Fadell et al. |
| 8,489,245 B2 | | 7/2013 | Carrel et al. |
| 8,583,288 B1 | | 11/2013 | Rossi et al. |
| 8,630,741 B1 | | 1/2014 | Matsuoka et al. |
| 8,660,813 B2 | | 2/2014 | Curtis et al. |
| 8,690,751 B2 | | 4/2014 | Auphan |
| 8,751,432 B2 | | 6/2014 | Berg-Sonne et al. |
| 8,805,000 B2 | | 8/2014 | Derby et al. |
| 8,812,344 B1 | * | 8/2014 | Saurabh ............. G06K 9/00778 705/7.29 |
| 9,031,703 B2 | | 5/2015 | Nakamura et al. |
| 9,317,813 B2 | * | 4/2016 | McGavran ........... G06N 99/005 |
| 2002/0065581 A1 | | 5/2002 | Fasca |
| 2002/0178047 A1 | | 11/2002 | Or et al. |
| 2002/0198629 A1 | * | 12/2002 | Ellis .............................. 700/286 |
| 2003/0011486 A1 | | 1/2003 | Ying |
| 2003/0018517 A1 | * | 1/2003 | Dull et al. ........................ 705/10 |
| 2003/0023467 A1 | | 1/2003 | Moldovan |
| 2003/0216971 A1 | | 11/2003 | Sick et al. |
| 2004/0024717 A1 | * | 2/2004 | Sneeringer ..................... 705/412 |
| 2004/0111410 A1 | * | 6/2004 | Burgoon et al. .................. 707/4 |
| 2004/0140908 A1 | | 7/2004 | Gladwin et al. |
| 2005/0257540 A1 | | 11/2005 | Choi et al. |
| 2006/0089851 A1 | | 4/2006 | Silby et al. |
| 2006/0103549 A1 | | 5/2006 | Hunt et al. |
| 2007/0061735 A1 | | 3/2007 | Hoffberg et al. |
| 2007/0203860 A1 | | 8/2007 | Golden et al. |
| 2007/0213992 A1 | | 9/2007 | Anderson et al. |
| 2007/0255457 A1 | | 11/2007 | Whitcomb et al. |
| 2007/0260405 A1 | | 11/2007 | McConnell et al. |
| 2008/0027885 A1 | | 1/2008 | van Putten et al. |
| 2008/0167535 A1 | | 7/2008 | Stivoric et al. |
| 2008/0195561 A1 | | 8/2008 | Herzig |
| 2008/0281473 A1 | | 11/2008 | Pitt |
| 2008/0281763 A1 | | 11/2008 | Yliniemi |
| 2008/0306985 A1 | | 12/2008 | Murray et al. |
| 2009/0106202 A1 | * | 4/2009 | Mizrahi ............ G06F 17/30887 |
| 2009/0204267 A1 | | 8/2009 | Sustaeta et al. |
| 2009/0326726 A1 | | 12/2009 | Ippolito et al. |
| 2010/0025483 A1 | | 2/2010 | Hoeynck et al. |
| 2010/0076835 A1 | | 3/2010 | Silverman .................. 705/14.33 |
| 2010/0082174 A1 | | 4/2010 | Weaver |
| 2010/0099954 A1 | | 4/2010 | Dickinson et al. |
| 2010/0138363 A1 | | 6/2010 | Batterberry et al. |
| 2010/0156665 A1 | | 6/2010 | Krzyzanowski et al. |
| 2010/0179704 A1 | * | 7/2010 | Ozog ............................. 700/291 |
| 2010/0198713 A1 | | 8/2010 | Forbes, Jr. et al. |
| 2010/0217452 A1 | | 8/2010 | McCord et al. |
| 2010/0217549 A1 | | 8/2010 | Galvin et al. |
| 2010/0217550 A1 | | 8/2010 | Crabtree et al. |
| 2010/0217642 A1 | | 8/2010 | Crubtree et al. |
| 2010/0217651 A1 | * | 8/2010 | Crabtree ................. G06Q 10/00 705/7.22 |
| 2010/0232671 A1 | * | 9/2010 | Dam et al. ...................... 382/132 |
| 2010/0286937 A1 | | 11/2010 | Hedley et al. |
| 2010/0289643 A1 | | 11/2010 | Trundle et al. |
| 2010/0324962 A1 | | 12/2010 | Nesler et al. |
| 2010/0332373 A1 | * | 12/2010 | Crabtree et al. ................. 705/37 |
| 2011/0022429 A1 | * | 1/2011 | Yates ..................... G06Q 10/00 705/313 |
| 2011/0023045 A1 | * | 1/2011 | Yates et al. .................... 718/104 |
| 2011/0040666 A1 | | 2/2011 | Crabtree et al. |
| 2011/0061014 A1 | | 3/2011 | Frader-Thompson et al. |
| 2011/0063126 A1 | | 3/2011 | Kennedy et al. |
| 2011/0106316 A1 | | 5/2011 | Drew et al. |
| 2011/0106328 A1 | | 5/2011 | Zhou et al. |
| 2011/0106471 A1 | | 5/2011 | Curtis et al. |
| 2011/0153102 A1 | | 6/2011 | Tyagi et al. |
| 2011/0178842 A1 | * | 7/2011 | Rane ................. G06F 17/30598 705/7.31 |
| 2011/0178937 A1 | | 7/2011 | Bowman |
| 2011/0205245 A1 | | 8/2011 | Kennedy et al. |
| 2011/0231320 A1 | | 9/2011 | Irving |
| 2011/0251730 A1 | | 10/2011 | Pitt |
| 2011/0251807 A1 | | 10/2011 | Rada et al. |
| 2011/0282505 A1 | | 11/2011 | Tomita et al. |
| 2012/0036250 A1 | | 2/2012 | Vaswani et al. |
| 2012/0053740 A1 | | 3/2012 | Venkatakrishnan |
| 2012/0066168 A1 | | 3/2012 | Fadell et al. |
| 2012/0078417 A1 | | 3/2012 | Connell, II et al. |
| 2012/0084063 A1 | | 4/2012 | Drees et al. |
| 2012/0095794 A1 | * | 4/2012 | Guthridge ............ G06Q 10/063 705/7.11 |
| 2012/0215369 A1 | | 8/2012 | Desai et al. |
| 2012/0216123 A1 | | 8/2012 | Shklovskii et al. |
| 2012/0259678 A1 | | 10/2012 | Overturf et al. |
| 2012/0290230 A1 | | 11/2012 | Berges Gonzalez et al. |
| 2013/0060531 A1 | | 3/2013 | Burke et al. |
| 2013/0060720 A1 | | 3/2013 | Burke |
| 2013/0173064 A1 | | 7/2013 | Fadell et al. |
| 2013/0253709 A1 | | 9/2013 | Renggli et al. |
| 2013/0261799 A1 | | 10/2013 | Kuhlmann et al. |
| 2013/0262040 A1 | | 10/2013 | Buckley |
| 2014/0006314 A1 | | 1/2014 | Yu et al. |
| 2014/0019319 A1 | | 1/2014 | Derby et al. |
| 2014/0074300 A1 | | 3/2014 | Shilts et al. |
| 2014/0107850 A1 | | 4/2014 | Curtis |
| 2014/0148706 A1 | | 5/2014 | Van Treeck et al. |
| 2014/0163746 A1 | | 6/2014 | Drew et al. |
| 2014/0207292 A1 | | 7/2014 | Ramagem et al. |
| 2014/0337107 A1 | | 11/2014 | Foster |
| 2015/0227846 A1 | | 8/2015 | Mercer et al. |
| 2015/0267935 A1 | | 9/2015 | Devenish et al. |
| 2015/0269664 A1 | | 9/2015 | Davidson |

(56) References Cited

U.S. PATENT DOCUMENTS

| | | |
|---|---|---|
| 2015/0310019 A1 | 10/2015 | Royer et al. |
| 2015/0310463 A1 | 10/2015 | Turfboer et al. |
| 2015/0310465 A1 | 10/2015 | Chan et al. |

FOREIGN PATENT DOCUMENTS

| | | |
|---|---|---|
| CA | 2832211 | 11/2012 |
| CN | 101996215 A | 3/2011 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Searching Authority, International Search Report—International Application No. PCT/US2012/036539, dated Jul. 6, 2012, together With the Written Opinion of the International Searching Authority, 17 pages.

International Search Report and Written Opinion for PCT Application No. PCT/US2015/038692, dated Sep. 24, 2015, 13 pages.

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Author Unknown, "An Inconvenient Truth," Jan. 9, 2008, 2 pages, available at https://web.archive.org/web/2008019006609/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May 19, 2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Chen, Hanfeng, et al., "Testing for a Finite Mixture Model With Two Components," Journal of the Royal Statistical Society, Series B, vol. 66, No. 1, 26 pages, 2004.

De Prensa, Boletine, "TXU Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.

D'Urso, M., et al., "A Simple Strategy for Life Signs Detection via an X-Band Experimental Set-Up," Progress In Electromagnectics Research C, vol. 9, pp. 119-129 (2009).

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Fels, Margaret F., "PRISM: An Introduction," Elsevier Sequoia, Energy and Buildings, vol. 9, pp. 5-18, 1986.

Fels, Margaret F., et al., Seasonality of Non-heating Consumption and Its effect on PRISM Results, Elsevier Sequoia, Energy and Buildings, vol. 9, pp. 139-148, 1986.

Figueiredo, Vera, et al., "An Electric Energy Consumer Characterization Framework Based on Data Mining Techniques," IEEE Transactions on Power Systems, vol. 20, No. 2, pp. 596-602, May 2005.

Fitbit® Official Site, "Flex, One & Zip Wireless Activity & Sleep Trackers," http://www.fitbit.com/, 4 pages, Jul. 15, 2013.

Friedman, Jerome, et al., "Regularization Paths for Generalized Linear Models via Coordinate Descent," Journal of Statistical Software, vol. 33, Iss. 1, pp. 1-22, Jan. 2010.

Goldberg, Miriam L., et al., "Refraction of PRISM Results into Components of Saved Energy," Elsevier Sequoia, Energy and Buildings, vol. 9, pp. 169-180, 1986.

Jansen, R.C., "Maximum Likelihood in a Generalized Linear Finite Mixture Model by Using the EM Algorithm," Biometrics, vol. 49, pp. 227-231, Mar. 1993.

Jawbone, "Know yourself. Live better." https://jawbone.com/up/, 7 pages, Jul. 15, 2013.

Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.

Liang, Jian, et al. "Load Signature Study—Part II: Disaggregation Framework, Simulation, and Applications," IEEE Transactions On Power Delivery, vol. 25, No. 2, pp. 561-569, Apr. 2010.

Liang, Jian, et al., "Load Signature Study—Part I: Basic Concept, Structure, and Methodology," IEEE Transactions On Power Delivery, vol. 25, No. 2, pp. 551-560, Apr. 2010.

Mint.com, "Budgets you'll actually stick to," Budgeting—Calculate and Categorize your spending, https://www.mint.com/how-it-works/budgeting/, 2 pages, Jul. 12, 2013.

Mint.com, "We're always on alert." Alerts for bills, fees & going over budget, https://www.mint.com/how-it-works/alerts/, 2 pages, Jul. 12, 2013.

Mori, Hiroyuki, "State-of-the-Art Overview on Data Mining in Power Systems," IEEE, pp. 33-37, 2006.

(56) References Cited

OTHER PUBLICATIONS

Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f.. uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions On Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.
The State Intellectual Property Office of the People's Republic of China, Second Office Action and Search Report (partial translation), dated Aug. 8, 2016 (9 pgs).
Wang, Lei, et al., "Improved Adaptive Affinity Propagation Clustering Based On Semi-Supervised Learning," Application Research of Computers, vol. 27, No. 12, Dec. 31, 2010.
Canadian Office Action in co-pending CA Application No. 2832211, filing date May 4, 2012, notification date Feb. 20, 2018.

\* cited by examiner

| Iteration | Common Criteria | Similar Consumers |
|---|---|---|
| 1 | Heat Type<br># of occupants<br>Sqft (10%)<br>Distance (3 Miles)<br>Dwelling Type<br>Meter Read Cyle | 50 |
| 2 | Heat Type<br><s># of occupants</s><br>Sqft (25%)<br>Distance (10 Miles)<br>Dwelling Type<br>Meter Read Cyle | 80 |
| 3 | <s>Heat Type</s><br><s># of occupants</s><br><s>Square footage</s><br>Distance (100 Miles)<br>Dwelling Type<br>Meter Read Cyle | 100 |

FIG. 2

| Iteration | Common Criteria | Similar Consumers |
|---|---|---|
| 1 | Heat Type<br>Sqft (10%)<br>Distance (1 Mile)<br>Meter Read Cyle | 99 |
| 2 | Heat Type<br>Sqft (10%)<br>Distance (1.05 Miles)<br>Meter Read Cyle | 106 |

| Iteration | Common Criteria | Similar Consumers |
|---|---|---|
| 1 | Heat Type<br>Sqft (10%)<br>Distance (1 Mile)<br>Meter Read Cyle | 3 |
| 2 | Heat Type<br>Sqft (10%)<br>Distance (9 Miles)<br>Meter Read Cyle | 43 |
| 3 | Heat Type<br>Sqft (10%)<br>Distance (13 Miles)<br>Meter Read Cyle | 93 |
| 4 | Heat Type<br>Sqft (10%)<br>Distance (10.5 Miles)<br>Meter Read Cyle | 102 |

FIG. 7

| Iteration | Common Criteria | Similar Consumers |
|---|---|---|
| 1 | Heat Type<br>Sqft (10%)<br>Distance (1 Mile)<br># of occupants<br>Age of occupants<br>Dwelling Type<br>Presense of pool<br>Meter Read Cyle | 0 |
| 2 | Heat Type<br>Sqft (10%)<br>Distance (1 Mile)<br><s># of occupants</s><br><s>Age of occupants</s><br>Dwelling Type<br>Presense of pool<br>Meter Read Cyle | 90 |
| 3 | Heat Type<br>Sqft (11%)<br>Distance (1.1 Mile)<br><s># of occupants</s><br><s>Age of occupants</s><br>Dwelling Type<br>Presense of pool<br>Meter Read Cyle | 102 |

…
METHOD AND SYSTEM FOR SELECTING SIMILAR CONSUMERS

RELATED APPLICATION

The present application claims priority from provisional application No. 61/483,219, filed May 6, 2011. This application is incorporated herein by reference.

TECHNICAL FIELD

The present invention relates to energy use reporting, and more particularly to building energy use reporting.

BACKGROUND

It is known in the prior art to report a consumer's resource usage as compared to the resource usage of his neighbors. In some cases, the consumer is compared to the average resource usage in his particular geographic area. The problem with such a comparison, however, is that numerous factors affect energy use and the consumer's home energy use is probably very different than most of the other homes within his geographic area. Thus, the consumer might view the comparison as unfair. If the consumer does not believe the comparison is legitimate, then he is unlikely to change his resource conservation practices based on the comparison. To address this problem, prior art methods select neighbors that have similar characteristics to the consumer. This methodology works adequately for areas where homes share many common characteristics. Such a methodology, however, does not work as well for areas where factors other than geography should be considered to accurately determine similar consumers.

SUMMARY OF THE PREFERRED EMBODIMENTS OF THE INVENTION

Illustrative embodiments of the present invention are directed to a computerized-method for reporting a first consumer's usage of a resource. A computer system retrieves consumer characteristic data and resource usage data for the first consumer and a set of second consumers. The consumer characteristic data including a plurality of characteristics related to each consumer. The computer system selects at least one consumer that is similar to the first consumer from the set of second consumers based upon a plurality of common criteria between the first consumer's characteristic data and a second consumer's characteristic data. The common criterion is one of:
  a match between a characteristic of the first consumer's characteristic data and a characteristic of a second consumer's characteristic data; and
  a match between a range and a second consumer's characteristic data.
If a total number of similar consumers selected is less than a predetermined number of consumers, the computer system performs at least one action from a set of potential actions to abate the common criteria. The set of potential actions includes:
  removing at least one common criterion; and
  increasing at least one range for at least one of the common criterion.
The computer processes may be performing iteratively until the total number of similar consumers is equal to or greater than the predetermined number of consumers. Once a desired number of similar consumers is found, the computer system generates an electronic report that displays the first consumer's resource usage data and the at least one similar consumers' resource usage data. Embodiments of the invention may require the number of common criteria to be a predefined number of selected characteristics. For example, the number of common criteria may be set to four at the beginning of the process.

In certain embodiments of the invention, the common criteria are abated to a degree and the degree to which they are abated depends on at least one of:
  (1) the number of similar consumers selected in a latest iteration; and
  (2) the total number of similar consumers selected in all of the iterations thus far.

In other embodiments, the degree of abatement depends on a function. The function operates such that as the number of similar consumers selected in a latest iteration decreases, the range for at least one common criterion increases. The function may also operate such that as the number of similar consumers selected in a latest iteration decreases, the number of removed common criterion decreases. In other embodiments, the degree of abatement depends on a function wherein, as the total number of similar consumers selected in all of the iterations decreases, the number of removed common criterion decreases.

The method may be applied to a set of consumers, such as home occupants.

The method may be applied to a set of non-resident resource consumers, such as a factory, a retail store, and/or an office building. Non-resident resource consumers may include private and government facilities.

The common criteria may be selected from a group including:
  a common dwelling type;
  a common meter read cycle;
  a common heating fuel;
  a common home size;
  a common number of home occupants;
  a common presence of a photovoltaic system;
  a common presence of a pool;
  a common presence of air conditioning;
  a common home age;
  a common age for one or more home occupants;
  common seasonal home residents; and
  a common home location.

For non-resident resource consumers, the common criteria may be selected from a group including:
  a common building and/or factory type;
  a common meter read cycle;
  a common heating fuel;
  a common building and/or factory size or floor space;
  a common type of equipment located on-site, including manufacturing equipment;
  a common number of building occupants, including number of employees, visitors or patrons;
  a common presence of a photovoltaic system;
  a common presence of air conditioning;
  a common building and/or factory age;
  a common business type for one or more building and/or factory occupants; and
  a common building and/or factory location.

As previously stated, the number of common criteria may vary in different embodiments, for example in one embodiment the number may be equal to 3. In other embodiments the number of common criteria may be equal to 4, 5, or 6 or more.

A match between a characteristic of the first consumer's characteristic data and a characteristic of a second consumer's characteristic data may include determining a match between types of heating fuel used, the number of household occupants, the presence of a photovoltaic system, and the geographical location of the consumers.

A match between a second consumer's building data and a range comprises may include at least one of:
- a match between a size of a second consumer's home and a range that is determined based upon a size for the first consumer's home,
- a match between the first consumer's meter read cycle and a range that is determined based upon a meter read cycle for the first consumer's home,
- a match between a number of occupants in a second consumer's home and a range that is determined based upon a number of occupants in the first consumer's home; and
- a match between a distance between a second consumer's home and the first consumer's home and a distance range.

As used in this specification the term resource usage data includes at least one of the following: electrical usage data, gas usage data, waste usage data, water usage data, sewer usage data, garbage usage data, recycling usage data, phone usage data, and broadband access usage data. Resource may also include non-tangible commodities including carbon credits. Resource may further include data of energy resource generated on-site, including, for example, data from a photovoltaic system, a wind system, and/or a solar-heating system. The resource usage data may be retrieved from resource usage meters, wherein the resource usage meters are part of an advanced metering infrastructure. The resource usage data may be retrieved from a secondary meter that interfaces to the resource usage meter.

The report may be further communicated to the first consumer as part of a resource usage bill. The report may be generated as a physical bill. In addition, the described methodology can be employed in a computer system wherein the computer system may include one or more processors that enable aspects of the invention. Additionally, the methodology can be implemented in computer code and stored on a non-transitory computer readable medium for operation on a computer or computer system where the computer readable medium contains computer code thereon.

BRIEF DESCRIPTION OF THE DRAWINGS

The foregoing features of the invention will be more readily understood by reference to the following detailed description, taken with reference to the accompanying drawings, in which:

FIG. 2 shows one application of the computerized method, in accordance with one embodiment of the present invention;

FIG. 6 shows one application of the computerized method, in accordance with one embodiment of the present invention;

FIG. 7 shows another application of the computerized method, in accordance with one embodiment of the present invention;

FIG. 9 shows a further application of the computerized method, in accordance with one embodiment of the present invention.

DETAILED DESCRIPTION OF SPECIFIC EMBODIMENTS

Illustrative embodiments of the present invention are directed to methods and systems for reporting a consumer's usage of a resource. In various illustrative embodiments of the present invention, a report is generated that allows a consumer to compare his resource usage against the resource usage of similar consumers. The report may be electronic or may be generated as a physical hard copy that is mailed to the consumers. Illustrative embodiments of the present invention advantageously provide for selection of the most similar consumers.

Figure 1:
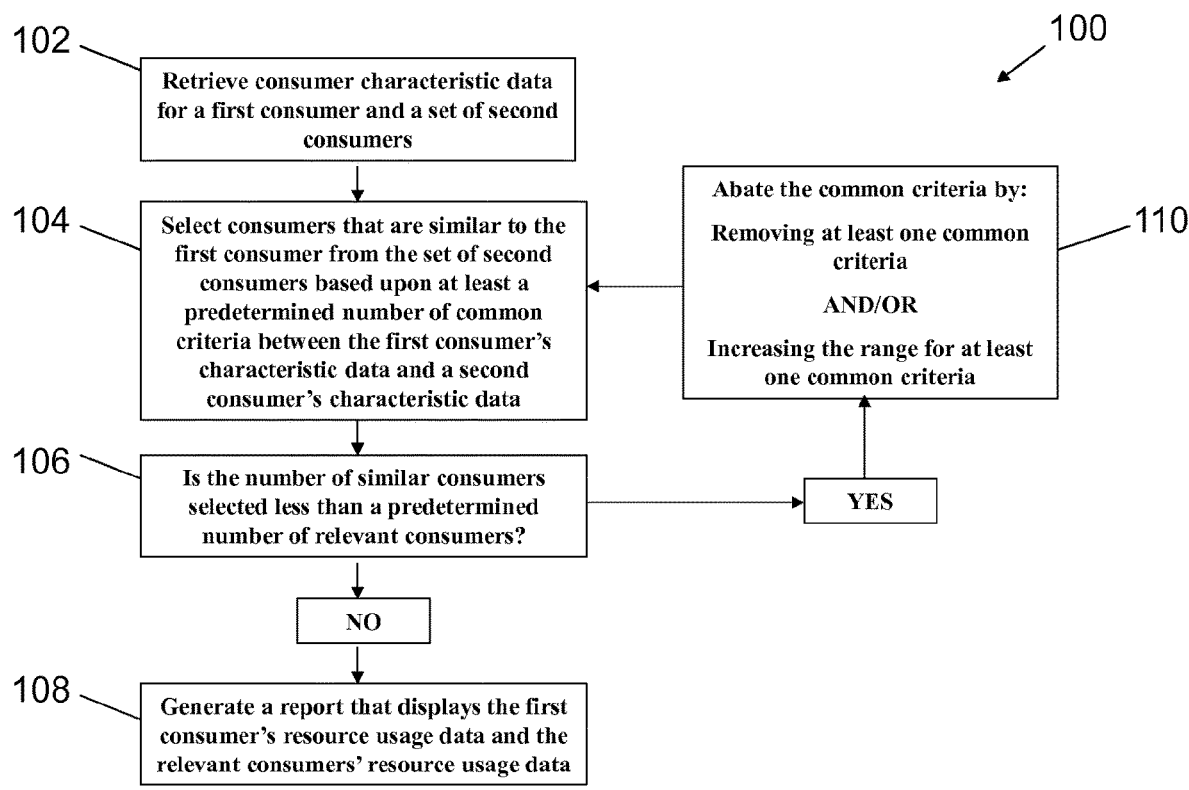
FIG. 1 shows a computerized method for reporting a consumer's usage of a resource, in accordance with one embodiment of the present invention.

FIG. 1 shows a computerized method 100 for reporting a consumer's usage of a resource, in accordance with one embodiment of the present invention. The method starts by retrieving consumer characteristic data and resource usage data for a first consumer and a set of second consumers 102. The consumer characteristic data includes a plurality of characteristics related to each consumer. For example, the characteristic data may include building data related to the physical characteristics of the consumer's building (e.g., size of the physical property, heating system, and/or age of the property). The characteristic data may also include characteristics of the consumer himself (e.g., age of the consumer and/or number of property occupants).

In one illustrative embodiment of the present invention, the consumers are any party associated with a building (e.g., tenant, landlord, owner, or manager). In various illustrative embodiments, the consumers are home occupants, such as renters or home owners, and the characteristic data includes characteristic data related to the physical characteristics of the occupants' homes. The homes might be houses, townhouses, condos, single-family houses, multi-family houses, or apartments. In such an embodiment, the characteristic data may include characteristic data related to the physical properties of each home, as selected from the following non-limiting list of examples:
- A dwelling type (e.g., house, condo, apartment, single-family, multi-family, and/or townhouse),
- A meter read cycle,
- A heating fuel (e.g., electric, gas, or other),
- A home size (e.g., square feet and/or number of bedrooms),
- Presence of a photovoltaic system,
- Presence of a pool,
- Presence of air conditioning,
- A home age, and
- A home location (e.g., street address, city, zip code, latitude, longitude, and/or elevation).

The characteristic data may also include characteristic data related to the home occupants themselves, as selected from the following non-limiting list of examples:

Number of occupants within the home,
Age for one or more home occupants, and
Whether home occupants are seasonal home residents.

The retrieved characteristic data also includes resource usage for the consumers. For example, in one embodiment, the resource data may include electrical usage data reported in kilowatt-hours. In additional or alternative embodiments, the resource usage data may include natural gas reported in British Thermal Units (BTU), oil using gallons, and/or wood pellets using pounds. Furthermore, in illustrative embodiments, the resource usage data may include data related to any one or more of electrical usage data, gas usage data, waste usage data, water usage data, sewer usage data, garbage usage data, recycling usage data, phone usage data, and broadband access usage data.

In exemplary embodiments of the present invention, at least one consumer that is similar to the first consumer is selected from the set of second consumers based upon at least four common criteria between the first consumer's characteristic data and a second consumer's characteristic data 104. In one embodiment, a common criterion is a match between a characteristic of the first consumer's characteristic data and a characteristic of a second consumer's characteristic data. For example, a common criterion exists when a first consumer and a second consumer both occupy the same dwelling type (e.g., they both occupy an apartment). Another example of a common criterion is when the first consumer and the second consumer both use the same heating fuel (e.g., they both use electricity to heat their homes). If a second consumer uses gas to heat his home, then that second consumer is not selected as a similar consumer to the first consumer. In yet another example, a common criterion exists when a first consumer and a second consumer both have the same location (e.g., they both occupy homes in the same building, zip code, city, or state).

In an alternative or an additional embodiment of the present invention, the common criterion is a match between a range and a second consumer's characteristic data. For example, in one embodiment, the common criterion is a match between a size of a second consumer's home and a range that is determined based upon a size for the first consumer's home. In one illustrative embodiment, the range is plus/minus 8% of the size (in square feet) of the first consumer's home. If the size of the second consumer's home (in square feet) falls within that range, then the size of the home is a common criterion between the first consumer and the second consumer. In another example, a common criterion is a match between a distance between a second consumer's home and the first consumer's home and a distance range. For example, the distance rage might be all homes within a 1 mile radius of the first consumer's home. If the second consumer's home falls within the 1 mile radius, then it matches the first consumer for the home location criterion. Homes that fall outside the 1 mile radius are not selected as similar consumers. In another example, a consumer within a residence with 3 occupants might be matched if the second consumer's residence has a range of occupants, such as 2, 3, or 4 occupants.

In the embodiment shown in FIG. 1, similar consumers are selected on the basis of four common criteria. In other embodiments, however, similar consumers can be selected on the basis of 3, 5, 10, or even 25 common criteria. In one particular embodiment, similar consumers are selected based upon (1) a common dwelling type, (2) a common meter read cycle, (3) a common heating fuel, (4) a common home size, and (5) a common home location.

If the number of similar consumers selected is less than a predetermined number of consumers 106, then actions are taken to abate, or relax, the common criteria 110. In one illustrative embodiment, the predetermined number is 100 and thus the goal is to select 100 second consumers that are most similar to the first consumer. If the number of selected consumers is less than 100, then the criteria are abated by removing at least one common criterion from the selection process. For example, to abate four common criteria, one of the common criteria is removed so that there are only three common criteria for selecting similar consumers. In this way, a greater number of second consumers will meet the common criteria.

In additional or alternative embodiments, the criteria are abated by increasing at least one range for at least one of the common criteria. For example, in one illustrative embodiment, the range of plus/minus 8% of the size of the first consumer's home is increased to plus/minus 16% of the size of the first consumer's home so that a greater number of second consumer's fall into the range. Once the criteria are abated, the selection process is run again. The selection and abating process is performed iteratively until the number of similar consumers is equal to or greater than the predetermined number of consumers (e.g., 100 similar consumers). For example, if three common criteria still do not generate 100 similar consumers, then the common criteria are further abated by, for example, removing another common criterion and/or by increasing a range for a least one of the common criteria. Once the selection process selects a number of similar consumers that is equal to or greater than the predetermined number of similar consumers, then an electronic report is generated that displays the first consumer's resource usage data and the similar consumers' resource usage data 108. This report can then be communicated to the first consumer so that he can compare his resource usage to that of similar consumers.

The selection process 104 can be implemented in various ways. For example, in one embodiment, when the distance range is increased from a from 1 mile to 5 miles, the selection process 104 looks for similar consumers within a radius of 5 miles from the first consumer's home. In another embodiment, the selection process 104 avoids re-analyzing the geographic area within 1 mile of the first consumer's home and instead looks for similar consumers within the geographic area between 1 mile and 5 miles from the first consumer's home. In this manner, the selection process 104 saves computing time and effort because the geographic area within 1 mile of the first consumer's home had already been analyzed in the previous iteration.

FIG. 2 shows one application 200 of the computerized method, in accordance with one embodiment of the present invention. In the embodiment shown in FIG. 2, the computerized method starts with six common criteria: (1) heat fuel type, (2) number of occupants in the home, (3) square feet of the home plus/minus 10% of the first consumer's home, (4) distance within 3 miles of the first consumer's home, (5) the same dwelling type, and (6) the same meter read cycle. The predetermined number of similar consumers in this embodiment is 100. When the selection process is run using these six common criteria, 50 similar consumers are found. Because 50 similar consumers is less than the predetermined 100 similar consumers, the six common criteria are abated. For the second iteration, the number of occupants criterion is removed as a common criteria. Also, the range for the square footage criterion is increased from plus/minus 10% to plus/minus 15% of the first consumer's home. Furthermore, the range for distance criterion is increased from within 3 miles of the first consumer's home to within 6 miles of the first consumer's home. When the selection process is run again, an additional 30 similar consumers are selected. Thus, the total number of similar consumers found after two iterations is 80. Since 80 similar consumers is less than the predetermined 100 similar consumers, the common criteria are again abated. For the third iteration, the heat type criterion and square footage criterion are removed, and the range for distance criterion is increased from within 6 miles of the first consumer's home to within 9 miles of the first consumer's home. When the selection process is run, it selects 20 more similar consumers. Accordingly, the total number of similar consumers at this point is 100 and the iterative process stops because the number of selected similar consumers is equal to the predetermined number.

In one illustrative embodiment of the invention, if there were 30 more consumers found in the third iteration, then 110 similar consumers would be used in the report. In another embodiment, however, the 30 consumers could be ranked according to, for example, distance or square footage, and the best 20 consumers would be selected as similar consumers for a total of 100 similar consumers.

Figure 3:
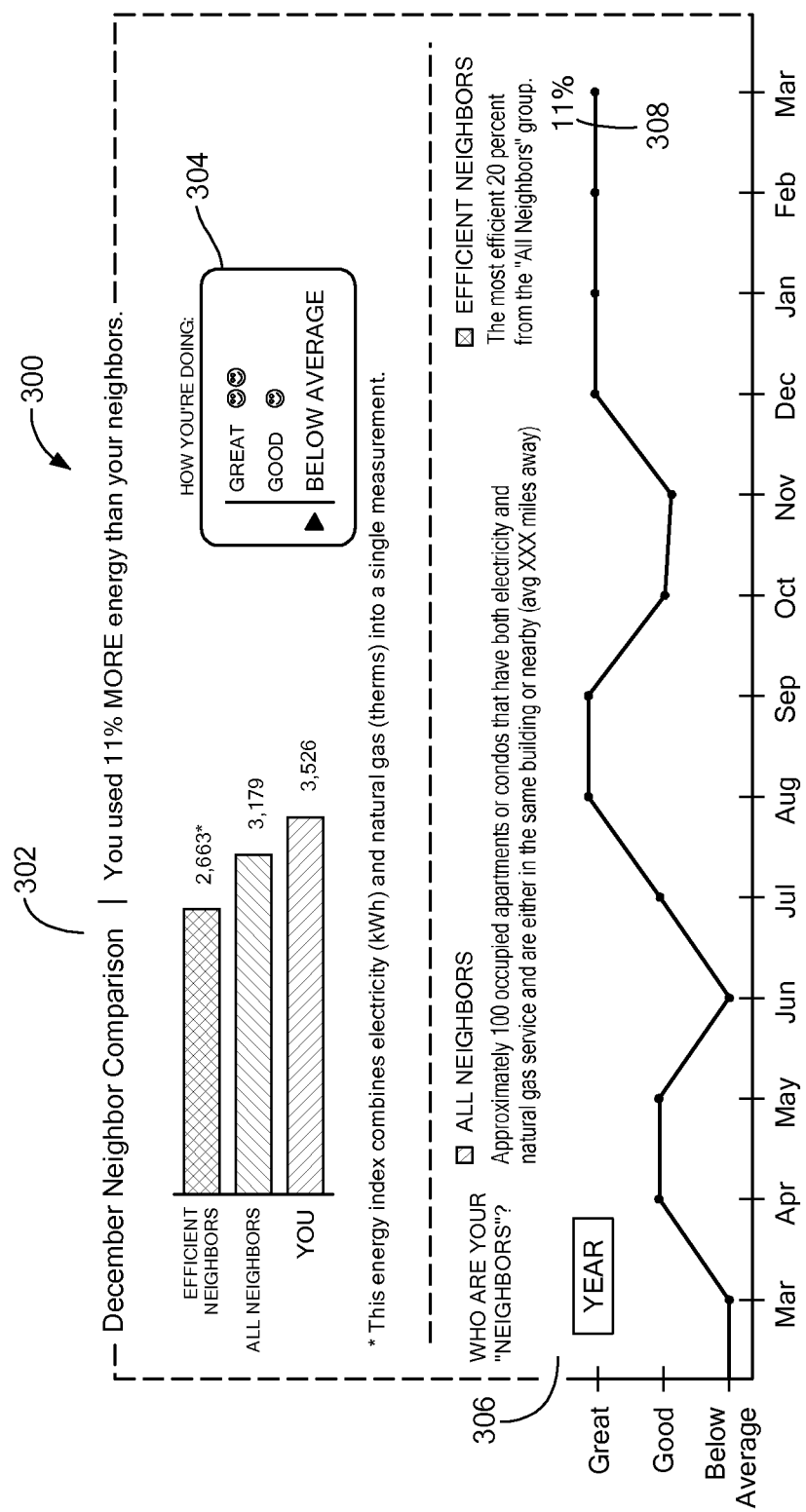
FIG. 3 shows an example of a resource usage report, in accordance with one embodiment of the present invention.

The 100 similar consumers are then used to generate an electronic report that displays the first consumer's resource usage data and the similar consumers' resource usage data. FIG. 3 shows an example of such a resource usage report 300, in accordance with one embodiment of the present invention. The report 300 shows the first consumer's energy usage for December as compared with his neighbor's energy usage. The report 300 combines electricity in kilowatt-hours and natural gas in therms into a single measurement. The neighbors in this example are the 100 similar consumers selected in the iterative process. A bar graph 302 in the report 300 shows that the first consumer's energy usage compares poorly against the average of all the neighbors (all 100 similar consumers) and also against the top 20 percent of the Neighbors (top 20% of 100 similar consumers). The report 300 states that the first consumer used 11% more energy than his neighbors and assigned the first consumer a "Below Average" rating 304. The report 300 may further display the consumer's rating 304 over time, which may be specified by the consumer. Illustrative embodiments of the report 300 motivate the first consumer to conserve energy by showing him that he compares unfavorably with his neighbors.

In some cases, the first consumer might question whether the comparison between him and his neighbors is fair. For example, the first consumer might question whether the similar consumers in the report live in close geographical proximity, or whether they live in a warmer geographic climate and therefore do not need to spend as much energy heating their homes. The report 300 alleviates this concern by explaining the basis of the comparison. In the report 300 shown in FIG. 3, the comparison is based upon "Approximately 100 occupied apartments or condos that have both electricity and natural gas service and are either in the same building or nearby." By showing the first consumer that the neighbors in the report 300 are in fact similarly situated, the report further motivates the consumer to conserve energy.

Figure 4:
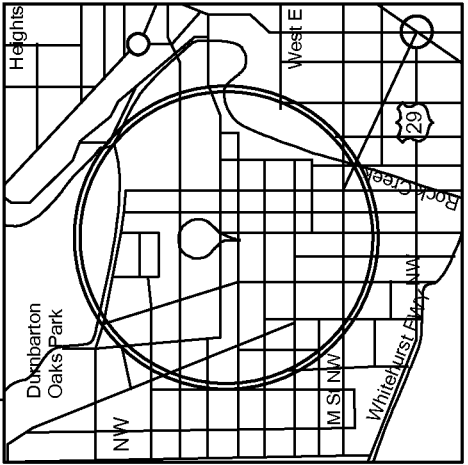
FIG. 4 shows an example of another energy use report, in accordance with one embodiment of the present invention.

FIG. 4 shows an example of another resource usage report 400, in accordance with one embodiment of the present invention. The report 400 shown in FIG. 4 provides even further detail about the basis of the comparison. The report 400 includes a map 402 that shows the geographical proximity of all of the similar consumers to the first consumer. The report 400 also shows the similar characteristics between the first consumer and the similar consumers (e.g., all are within 20 miles, all are within 2650-2800 square feet, 89% are apartments and so on).

In illustrative embodiments of the present invention, the reports 300 and 400 are communicated to the first consumer in various ways. In one example, the reports 300, 400 are sent to the first consumer via e-mail to the first consumer's e-mail account. In another example, the first consumer receives the reports 300,400 in hard copy form via regular mail. In yet another illustrative embodiment, the first consumer can log into his profile on a website and view the reports 300,400 in a web page. In some embodiments, the reports 300,400 are part of a resource usage bill, in other embodiments, the reports are provided to the consumer separately from the bill.

Figure 5:
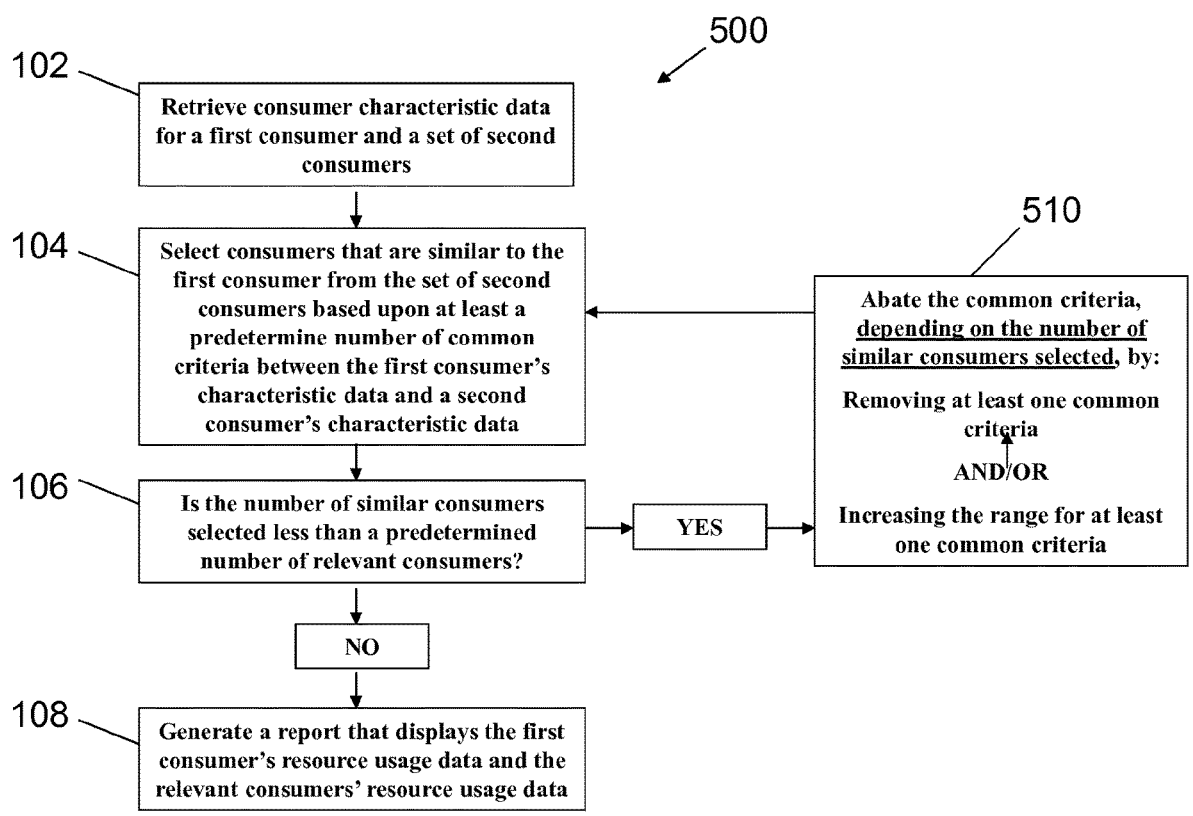
FIG. 5 shows another computerized method for reporting a consumer's usage of a resource, in accordance with one embodiment of the present invention.

FIG. 5 shows another computerized method for reporting a consumer's usage of a resource, in accordance with one embodiment of the present invention. The computerized method shown in FIG. 5 is similar to the method shown in FIG. 1. The method of FIG. 5, however, is additionally configured to be "adaptive" to the number of similar consumers selected in the iterative process. As explained above with respect to FIG. 1, if a number of similar consumers selected is less than a predetermined number, then the common criteria are abated to a degree. In the computerized method of FIG. 5, the degree to which those common criteria are abated depends on the number of similar consumers selected 510.

In illustrative embodiments of the present invention, the degree to which the common criteria are abated depends on the number of similar consumers selected in the last iteration. Table 1 below shows how, in one exemplary embodiment of the present invention, a distance range is increased based upon the number of similar consumers selected in the last iteration:

TABLE 1

| Number of Similar Consumers Selected in Last Iteration | Value Added to Distance Range |
|---|---|
| 0 | Initial Range × 2 |
| 1 to 10 | Add 1 Mile |
| 11 to 20 | Add 0.9 Miles |
| 21 to 30 | Add 0.8 Miles |
| 31 to 50 | Add 0.7 Miles |
| 51 to 60 | Add 0.6 Miles |
| 61 to 70 | Add 0.5 Miles |
| 71 to 80 | Add 0.4 Miles |
| 81 to 90 | Add 0.3 Miles |
| 91-95 | Add 0.2 Miles |
| 96 | Add 0.1 Miles |
| 97 | Add 0.09 Miles |
| 98 | Add 0.07 Miles |
| 99 | Add 0.05 Miles |

In Table 1 above, if there are no similar consumers found in the last iteration, then the previous distance range is doubled (e.g., 2 miles to 4 miles). If, on the other hand, 6 similar consumers are selected in the last iteration, then 1 mile is added to the distance range (e.g., 2 miles to 3 miles). In an additional or alternative embodiment, the degree to which the common criteria are abated depends on the total number of similar consumers selected in all of the iterations. Table 2 below shows how, in another exemplary embodiment of the present invention, a distance range is increased based upon the total number of similar consumers selected in all of the iterations:

TABLE 2

| Total Number of Similar Consumers Selected Thus Far | Value Added to Distance Range |
| --- | --- |
| 0 to 50 | Add 2 Miles |
| 51 to 80 | Add 1 Miles |
| 81 to 90 | Add 0.75 Miles |
| 91-95 | Add .50 Miles |
| 96 | Add .35 Miles |
| 97 | Add 0.2 Miles |
| 98 | Add 0.1 Miles |
| 99 | Add 0.05 Miles |

In further various illustrative embodiments, the distance range is increased based upon both the number of similar consumers selected in the last iteration and also the number of similar consumers selected in all of the iterations. Tables 1 and 2 above show a function wherein, as the number of similar consumers selected decreases, the range for at least one common criterion increases. And vice versa, as the number of similar consumers selected increases, the range for at least one common criterion decreases. In this manner, the iterative process does not overshoot the 100 most similar consumers, while the process saves computing time and effort by more efficiently closing in on the most similar consumers because there is no need to run many iterations using small increments. In additional embodiments, a desired and minimum number of similar neighbors may be defined. In such an embodiment, if the minimum number is reached the process will stop and if the desired number of neighbors is exceeded, the system will select the best neighbors that are equal to the desired number.

FIG. 6 shows one application 600 of the computerized method, in accordance with one embodiment of the present invention. In the embodiment shown in FIG. 6, the computerized method starts with four common criteria: (1) heat fuel type, (2) square feet of the home plus/minus 10% of the first consumer's home, (3) distance within 1 mile of the first consumer's home, and (4) the same meter read cycle. The predetermined number of similar consumers in this example is 100. When the selection process is run using these four common criteria, 99 similar consumers are found. Given that 99 similar consumers have been found in the first iteration, the range for the distance criterion is increased by a small amount (from 1 mile to 1.05 miles) so that the process does not greatly overshoot the 100 most similar consumers. Because of the small increase in the second iteration, only 7 more similar consumers are selected and the iterative process ends because the total number of similar consumers is 106 and this number exceeds 100.

FIG. 7 shows another application 700 of the computerized method wherein only 3 similar consumers are found in the first iteration. Because only 3 similar consumers are found in the first iteration, the distance range is increased by a larger increment to 5 miles. When run, the second iteration selects 40 more similar consumers. The iterations continue because another 57 similar consumers are required to meet the predetermined number of 100. The distance range is increased by another 5 miles so that the distance range for the third iteration is 10 miles. The third iteration selects 40 more similar consumers for a total of 93. Given that 93 similar consumers have already been selected, the range for the distance criterion is increased by a small amount (from 10 miles to 10.5 miles) and the fourth iteration is run. The fourth iteration selects another 9 similar consumers and the iterative process ends because greater than 100 similar consumers have been selected.

Although the "adaptive" process is explained above in terms of the distance criterion, this adaptive process can also be applied equally to other common criteria. For example, ranges associated with the size of the home, the meter read cycle, and number of home occupants can also be increased based upon both the number of similar consumers selected in the last iteration and/or the number of similar consumers selected in all of the iterations. In further illustrative embodiments, the "adaptive" process is applied so that the number of common criterion removed from the iterative process depends on the number of similar consumers selected.

Figure 8:
FIG. 8 shows yet another application of the computerized method, in accordance with one embodiment of the present invention.

FIG. 8 shows a further application 800 of the computerized method wherein the number of common criterion removed from the process is adaptive to the number of similar consumers selected. In the embodiment shown in FIG. 8, the computerized method starts with 8 common criteria. When the selection process is run using the 8 common criteria, there are no similar consumers selected. Accordingly, two common criteria are removed from the process. When the second iteration is run, there are 90 similar consumers found. Given that 90 is close to 100 (the predetermined number of similar consumers), in the next iteration only one common criterion is removed from the process. This results in an additional 15 similar consumers found in the third iteration and the iterative process stops because the total number of similar consumers exceeds the predetermined number. In one illustrative embodiment, the common criteria are removed from the process in order of importance.

The inventors of the present invention have discovered that certain common criteria are more meaningful to resource usage than other common criteria. The inventors discovered that geographic location is a very meaningful criterion. Consumers in different geographic locations will use different amount of energy because of climate differences. The size of the home is also a very important criterion. Large homes typically use more resources. Also, the present inventors surprisingly discovered that the meter read cycle is an important criterion for two reasons: first, customers with meter reads that occur at different times will be subject to different weather patterns (May 1-June 1 is probably cooler than May 20-June 20); second, the comparison reports require current data for both the consumer and their neighbors (it's impossible to generate comparisons if there is no resource usage data for the time period). Other less important criteria include the dwelling type, the fuel used for heating the home, the number of home occupants, the presence of a photovoltaic system, the presence of a pool, and whether or not the consumers are seasonal residents. Although many of these less important criteria are meaningful in terms of resource usage, in illustrative embodiments of the present invention, they are excluded before the most important criteria because they might rely on unreliable third party source data. For example, occupancy data might not be available for each home in the first consumer's geographic area. By removing the occupancy criterion, those homes now become available as similar consumers. The inventors also discovered that certain common criteria, such as the age of the home and the presence of retirees, are even less meaningful in relation to resource usage. Such criteria may be included nonetheless so that the selection process 104 appears more robust.

FIG. 9 shows a further application 900 of the computerized method wherein both the range of the common criterion and the number of common criterion are dependent on the number of similar consumers selected. In the embodiment shown in FIG. 9, the first iteration is run using the 8 common criteria and there are no similar consumers selected. Accordingly, two common criteria are removed from the process. When the second iteration is run, there are 90 similar consumers found. For the third iteration, the distance criterion is increased to 1.1 miles from 1.0 miles and the square footage criterion is increased to plus/minus 11% from plus/minus 10%. These modifications result in an additional 12 similar consumers in the third iteration. Again, the small incremental increase to the ranges prevent the process from significantly overshooting the 100 most similar consumers, but by removing two common criteria in the second iteration, the process avoids running many iterations using small incremental changes and therefore is much more computationally efficient. Illustrative embodiments of the adaptive process described with respect to FIGS. 6-9 intelligently recognize the population density of the first consumer's geographic area. For example, if the adaptive process makes a small degree of abatement and no further similar consumers are found, then the process intelligently recognizes that the population density in the area is likely sparse and that a greater degree of abatement is necessary. In this manner, illustrative embodiments of the invention help ensure that even consumers in sparsely populated areas have a comparison set of the most similar consumers.

The inventors of the present invention discovered that using the 100 most similar consumers for the report is advantageous because there are likely at least 100 reasonably similar consumers within a utility company's pool of customers. Also, 100 is a large enough number so that statistical anomalies and outliers within the group are mitigated. Furthermore, privacy is no longer a concern because a consumer will likely not be able to make out his neighbors within a group of 100 similar consumers. Yet, illustrative embodiments of the present invention are not restricted to using 100 similar consumers as the "predetermined" number. In some illustrative embodiments, the predetermined number is a range of numbers between for example 95 to 105 or 80 to 120. In various illustrative embodiments, the electronic report is generated using only one similar consumer, while in other illustrative embodiments the report is generated using as many as 5000 similar consumers.

Figure 10:
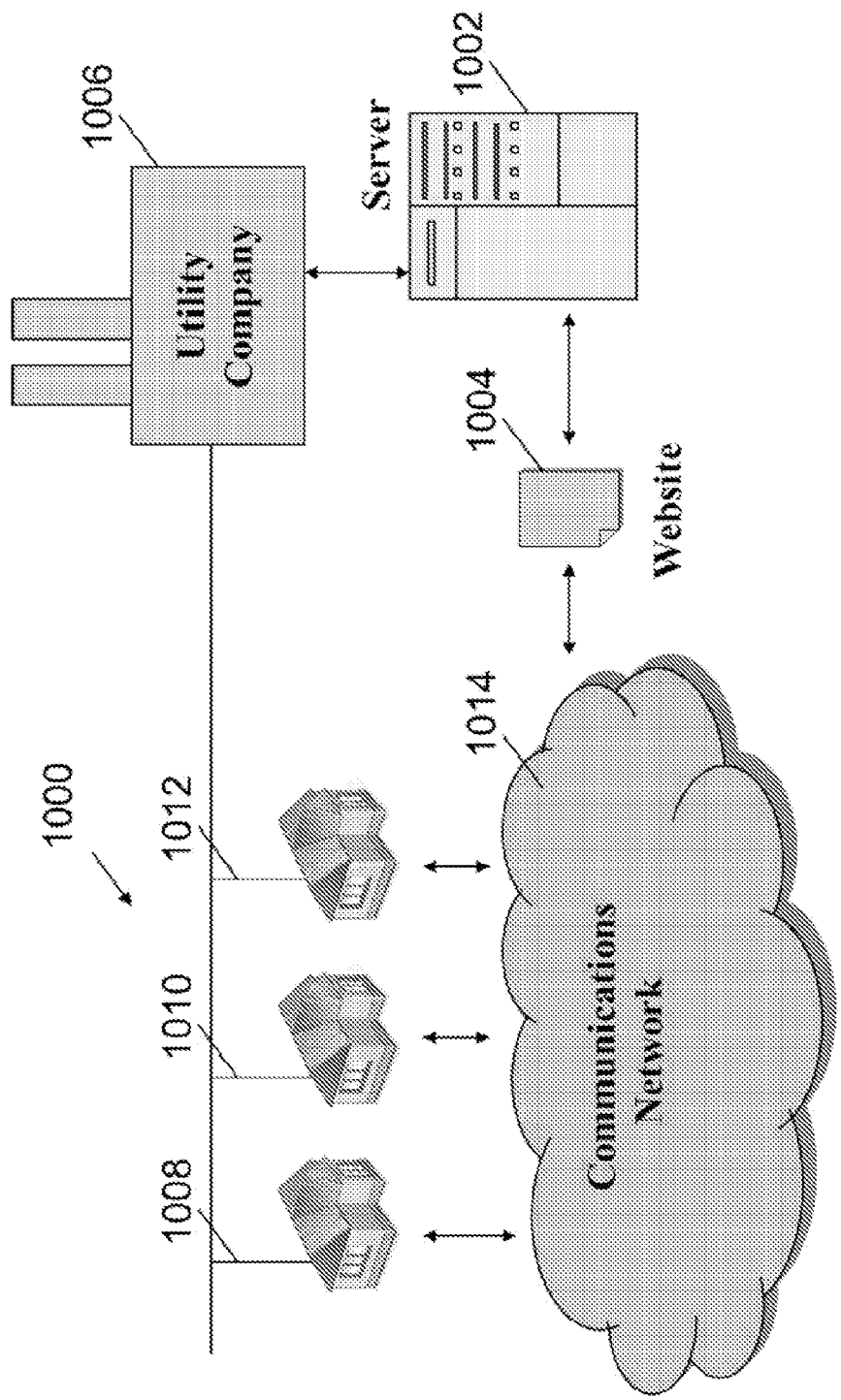
FIG. 10 shows a system for reporting a consumer's usage of a resource, in accordance with one embodiment of the present invention.

FIG. 10 shows a system 1000 for reporting a first consumer's usage of a resource, in accordance with one embodiment of the present invention. The system 1000 includes a server 1002 that, in some embodiments, supports a website 1004. The server 1002 is in communication with a utility company 1006. The utility company 1006 provides a resource such as electricity or gas to a plurality of buildings 1008, 1010, and 1012, which are each associated with a consumer. The utility company 1006 tracks each building's resource usage with a resource usage meter. In illustrative embodiments of the present invention, the resource usage meters are part of an advanced metering infrastructure. A secondary meter may be employed to meter energy generated on-site via a photovoltaic system, a solar-heating system, or a wind system. The secondary meter may interface with the resource usage meters to provide energy generated data to be used by as part of the resource usage data.

In illustrative embodiments, the building resource usage data is received by the server 1002 from the utility company 1006. The building resource usage data can be received by the server 1002 via a communications network 1014 (e.g., internet) through, for example, e-mails, downloaded FTP files, XML feeds, or metering feeds. However, in other embodiments, the global communications network is not used. Instead, the resource usage data is sent by, for example, regular mail.

The server 1002 also receives consumer characteristic data. This data can come from the consumer himself or from third party sources. In one embodiment, the consumer can use the website 1004 to log into his profile and add characteristic data. For example, if the consumer built a new addition to his home, he can log into his profile and modify the square footage of his home based upon the new addition. In another example, if the consumer's children move outside the home, the consumer can also update the occupancy information in his profile. In this manner, illustrative embodiments of the present invention help ensure that the selection of similar consumers is based on accurate data. In another embodiment of the present invention, the consumer characteristic data is received from third party sources, such as property tax assessment records, property sale records, aggregators of consumer data collected through surveys, warranty cards, customer loyalty programs, etc. In some embodiments, the consumer characteristic data can be received from the third party sources via the communications network 714 (e.g., e-mails, downloaded FTP files, and XML feeds). However, in other embodiments, the consumer characteristic data may be received by regular mail.

Using the resource usage data and the consumer characteristic data, the server 702 generates an electronic report that displays the resource usage data for each consumer and the resource usage data for each of their respective similar consumers and then communicates the report to the consumers. In various embodiments of the present invention, the server 702 communicates the report via the communications network 714. For example, the server 702 may send the report in an e-mail or, in another embodiment; the consumer may log into the server supported website 704 and view his report. In additional or alternative embodiments, the server 702 itself prints the report or provides the information to a printing system so that the data can be provided to the consumer via regular mail (e.g., as part of a utility bill). In other embodiments, the report is communicated back to the utility company 706 so that the utility company can provide the data to the consumer.

In exemplary embodiments of the invention, the server 1002 includes a processor that is programmed with any one or more of the following software modules:

- A utility communication module for receiving resource usage data.
- A third party source communication module for receiving consumer characteristic data.
- A website module for supporting the website.
- A storage module for storing consumer characteristic data and resource usage data.
- A retrieval module for retrieving consumer resource usage data and consumer characteristic data.
- A selection module for selecting similar consumers.
- A report module for generating a report that displays the resource usage data for the consumer and other similar consumers.
- A consumer communication module for communicating the report to the consumer via, for example, the website or e-mail.
- A printing module for the report to be sent to consumers via regular mail.

It should be apparent to those skilled in the art that the described system and method may be applied to non-resident resource consumers, such as a factory, a retail store, and/or an office building. In such an embodiment, the characteristic data may include characteristic data related to the physical properties of each home, as selected from the following non-limiting list of examples:

a common building and/or factory type;
a common meter read cycle;
a common heating fuel;
a common building and/or factory size or floor space;
a common type of equipment located on-site, including manufacturing equipment;
a common number of building occupants, including number of employees, visitors or patrons;
a common presence of a photovoltaic system;
a common presence of air conditioning;
a common building and/or factory age;
a common business type for one or more building and/or factory occupants; and
a common building and/or factory location.

It should be noted that terms such as "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A computerized method for reporting a first consumer's usage of a resource, the method comprising:
    retrieving, by a processor, consumer characteristic data and resource usage data for a first consumer and consumer characteristic data and resource usage data for each consumer in a set of second consumers, the consumer characteristic data including a plurality of characteristics related to each respective consumer, the resource usage data comprising at least one of: electricity usage data, or gas usage data;
    performing, by the processor, an iterative process comprising:
        selecting, by the processor, from the set of second consumers, a total number of similar consumers to define a data set of similar consumers, wherein the processor executes an adaptive process that extracts from memory the consumer characteristic data sequentially for each of the set of second consumers and applies a plurality of criteria as a function, wherein each selected consumer is similar according to the plurality of criteria matching the consumer characteristic data of the first consumer, wherein similarity is defined by the function, for each criterion of the plurality of criteria, as at least one of:
            a match between a characteristic of the selected consumer's characteristic data and a characteristic of the first consumer's characteristic data; and
            a match between a characteristic of the selected consumer's characteristic data and a range, the range being determined by a processor, based on at least one characteristic of the first consumer's characteristic data;
        monitoring, by the processor, a total number of the similar consumers selected in a previous iteration;
        determining, by the processor, a difference between the total number of the similar consumers selected in the previous iteration and a predetermined number of consumers;
        in response to the total number of the similar consumers selected in the previous iteration decreases and is less than the predetermined number of consumers, applying, by the processor, a programmatic abating function in the adaptive process to abate at least one criterion from the plurality of criteria, by:
            (a) calculating, by the processor, a degree of adjustment to one or more ranges of the plurality of criteria, wherein the calculated degree of adjustment is proportional to the determined difference between the total number of similar consumers selected in the previous iteration and the predetermined number of consumers; and
            wherein the degree of adjustment depends on the programmatic abating function wherein, as the total number of similar consumers selected in the latest iteration decreases, the range for at least one common criterion increases; and
            (b) programmatically adjusting, by the processor, a subsequent iteration by applying the calculated degree of adjustment comprising:
                (i) selecting and removing at least a first common criterion from the plurality of criteria based on the programmatic abating function; and
                (ii) selecting and adjusting, based on the calculated degree of adjustment, at least one range for a second criterion of the plurality of criteria that remains;
            wherein the abating reduces a number of iterations performed by the processor to define the data set of similar consumers to be at least the predetermined number of consumers; and
        repeating the iterative process using the abated plurality of criteria until the total number of the similar consumers selected at least matches the predetermined number of consumers; and
    generating, by the processor, a report that at least compares the first consumer's resource usage data and the at least one selected consumer's resource usage data, wherein the report is provided and is accessible via an email communication or is accessible via a website.

2. The method according to claim 1, wherein the programmatic abating function is configured to abate the at least one first common criterion by a degree that depends on at least one of:
    a number of selected consumers in the previous iteration; and
    a total number of selected consumers in all the previous iterations.

3. The method according to claim 2, wherein the degree of adjustment is calculated based at least in part on the number of selected consumers in the previous iteration, such that, as the total number of selected consumers in the previous iteration decreases, fewer of the at least one criterion are removed.

4. The method according to claim 2, wherein the degree of adjustment is calculated based at least in part on the total number of selected consumers in all the previous iterations, such that, as the total number of selected consumers in the iterations decreases, fewer of the at least one criterion are removed.

5. The method according to claim 1, wherein the first consumer and each consumer in the set of second consumers comprises a home occupant.

6. The method according to claim 5, wherein the plurality of criteria are selected from at least four characteristics selected from:
    a dwelling type,
    a meter read cycle,
    a heating fuel type,
    home size,
    a number of home occupants,
    presence of a photovoltaic system,
    presence of a pool;
    presence of air conditioning;
    a home age;

an age of one or more home occupants,
seasonal home residents, and
a home location.

7. The method according to claim 6, wherein the plurality of criteria are selected from at least:
   a dwelling type,
   a meter read cycle,
   a heating fuel type,
   a home size, and
   a home location.

8. The method according to claim 6, wherein selecting the at least one selected consumer comprises selecting the at least one selected consumer such that, for each selected consumer, a match between a characteristic of the first consumer's characteristic data and a characteristic of the selected consumer's characteristic data comprises at least one of:
   a match between the first consumer's heating fuel type and the selected consumer's heating fuel type;
   a match between a number of occupants in the first consumer's home and a number of occupants in a selected consumer's home;
   a match between the presence of a photovoltaic system in the first consumer's home and the presence of a photovoltaic system in a selected consumer's home; and
   a match between a location of the first consumer's home and a location of the selected consumer's home.

9. The method according to claim 6, wherein a match between a selected consumer's building data and a range comprises at least one of:
   a match between a size of the selected consumer's home and a range that is determined based upon a size for the first consumer's home,
   a match between the selected consumer's meter read cycle and a range that is determined based upon a meter read cycle for the first consumer's home,
   a match between a number of occupants in the selected consumer's home and a range that is determined based upon a number of occupants in the first consumer's home; and
   a match between a distance between the selected consumer's home and the first consumer's home and a distance range.

10. The method according to claim 1, wherein the resource usage data comprises at least one of waste usage data, water usage data, sewer usage data, garbage usage data, recycling usage data, phone usage data, or broadband access usage data.

11. The method according to claim 1, wherein retrieving resource usage data comprises receiving, by a processor, resource usage data from resource usage meters, wherein the resource usage meters are part of an advanced metering infrastructure.

12. The method according to claim 1, further comprising:
   communicating, by at least the processor, the report to the first consumer as part of a resource usage bill.

13. The method according to claim 1, wherein the report comprises an electronic report.

14. The method according to claim 1 further comprising:
   until the total number of similar consumers is at least equal to the predetermined number of consumers, iteratively performing, by at least the processor:
   the process of selecting, by at least the processor, from the set of second consumers, at least one selected consumer that is similar to the first consumer; and
   the process, if a total number of similar consumers selected is less than the predetermined number of consumers, of performing at least one action from a set of potential actions to abate the at least one criterion of the plurality of criteria.

15. At least one non-transitory computer readable medium encoded with instructions which when loaded on at least one computer and executed by at least one processor, establishes processes for reporting a first consumer's usage of a resource, wherein the executed instructions cause the processor to:
   retrieve, by at least the processor, consumer characteristic data and resource usage data for a first consumer and consumer characteristic data and resource usage data for each consumer in a set of second consumers, the consumer characteristic data including a plurality of characteristics related to each respective consumer, the resource usage data comprising at least one of: electricity usage data, or gas usage data, oil usage data, wood usage data, waste removal usage data, water usage data, sewer usage data, garbage removal usage data, recycling removal usage data, telephone usage data and broadband usage data;
   performing, by at least the processor, an iterative process comprising:
      selecting, by at least the processor, from the set of second consumers, a total number of similar consumers to define a data set of similar consumers, wherein the processor executes an adaptive process that extracts from memory the consumer characteristic data sequentially for each of the set of second consumers and applies a plurality of criteria as a function, wherein each selected consumer is similar according to the plurality of criteria matching the consumer characteristic data of the first consumer, wherein similarity is defined by the function, for each criterion of the plurality of criteria, as at least one of:
         a match between a characteristic of the selected consumer's characteristic data and a characteristic of the first consumer's characteristic data; and
         a match between a characteristic of the selected consumer's characteristic data and a range, the range being determined by a processor, based on at least one characteristic of the first consumer's characteristic data;
   monitoring, by the processor, a total number of the similar consumers selected in a previous iteration;
   determining, by the processor, a difference between the total number of the similar consumers selected in the previous iteration and a predetermined number of consumers;
   in response to the total number of the similar consumers selected in the previous iteration decreases and is less than the predetermined number of consumers, applying by the processor, a programmatic abating function in the adaptive process to abate at least one criterion from the plurality of criteria, by:
      (a) calculating, by the processor, a degree of adjustment to one or more ranges of the plurality of criteria, wherein the calculated degree of adjustment is proportional to the determined difference between the total number of similar consumers selected in the previous iteration and the predetermined number of consumers; and
      wherein the degree of adjustment depends on the programmatic abating function wherein, as the number of similar consumers selected in the latest iteration decreases, the range for at least one common criterion increases; and
(b) programmatically adjusting, by the processor, a subsequent iteration by applying the calculated degree of adjustment comprising:
  (i) selecting and removing, by at least the processor, at least a first criterion from the plurality of criteria based on the programmatic abating function; or
  (ii) selecting and adjusting, by at least the processor based on the calculation degree of adjustment, at least one range for a second criterion of the plurality of criteria that remains;
  wherein the abating reduces a number of iterations performed by the processor to define the data set of similar consumers to be at least the predetermined number of consumers; and
repeating the iterative process using the abated plurality of criteria until the total number of the similar consumers selected at least matches the predetermined number of consumers; and
generating, by at least the processor, a report that at least compares the first consumer's resource usage data and the at least one selected consumer's resource usage data, wherein the report is provided and is accessible via an email communication or is accessible via a website.

16. A system for reporting a first consumer's usage of a resource, the system comprising:
a processor; and
a memory storing instructions executable by the processor that when executed by the processor cause the processor to:
  retrieve, by at least the processor, consumer characteristic data and resource usage data for a first consumer and consumer characteristic data and resource usage data for each consumer in a set of second consumers, the consumer characteristic data including a plurality of characteristics related to each respective consumer, the resource usage data comprising at least one of: electricity usage data, gas usage data, oil usage data, wood usage data, waste removal usage data, water usage data, sewer usage data, garbage removal usage data, recycling removal usage data, telephone usage data or broadband usage data;
  performing, by at least the processor, an iterative process comprising:
  selecting, by the processor, from the set of second consumers, a total number of similar consumers to define a data set of similar consumers, wherein the processor executes an adaptive process that extracts from memory the consumer characteristic data sequentially for each of the set of second consumers and applies a plurality of criteria as a function, wherein each selected consumer is similar according to the plurality of criteria matching the consumer characteristic data of the first consumer, wherein similarity is defined by the function, for each criterion of the plurality of criteria, as at least one of:
    a match between a characteristic of the selected consumer's characteristic data and a characteristic of the first consumer's characteristic data; and
    a match between a characteristic of the selected consumer's characteristic data and a range, the range being determined by a processor, based on at least one characteristic of the first consumer's characteristic data;
  monitoring, by the processor, a total number of the similar consumers selected in a previous iteration;
  determining, by the processor, a difference between the total number of the similar consumers selected in the previous iteration and a predetermined number of consumers;
  in response to the total number of the similar consumers selected in the previous iteration decreases and is less than the predetermined number of consumers, applying, by the processor, a programmatic abating function in the adaptive process to abate at least one criterion of the plurality of criteria, by:
    (a) calculating, by the processor, a degree of adjustment to one or more ranges of the plurality of criteria, wherein the calculated degree of adjustment is proportional to the determined difference between the total number of similar consumers selected in the previous iteration and the predetermined number of consumers; and
    wherein the degree of adjustment depends on the programmatic abating function wherein, as the total number of similar consumers selected in the latest iteration decreases, the range for at least one common criterion increases; and
    (b) programmatically adjusting, by the processor, a subsequent iteration by applying the calculated degree of adjustment comprising:
      (i) selecting and removing, by at least the processor, a first criterion of the plurality of criteria based on the programmatic abating function; and
      (ii) selecting and adjusting, by at least the processor, based on the calculated degree of adjustment, at least one range for a second criterion of the plurality of criteria that remains;
      wherein the abating reduces a number of iterations performed by the processor to define the data set of similar consumers to be at least the predetermined number of consumers;
  repeating the iterative process using the abated plurality of criteria until the total number of the similar consumers selected at least matches the predetermined number of consumers; and
  generating, by at least the processor, an electronic report that at least compares the first consumer's resource usage data and the at least one selected consumers' resource usage data, wherein the report is provided and is accessible via an email communication or is accessible via a website.

* * * * *